Patented Jan. 10, 1933

1,893,492

UNITED STATES PATENT OFFICE

JOHN L. BRILL, OF CHARLESTON, WEST VIRGINIA, ASSIGNOR, BY MESNE ASSIGNMENTS, TO E. I. DU PONT DE NEMOURS & COMPANY, OF WILMINGTON, DELAWARE, A CORPORATION OF DELAWARE

PROCESS AND APPARATUS FOR CATALYTIC GASEOUS REACTIONS

Application filed December 31, 1928. Serial No. 329,553.

This invention relates to catalytic exothermic gaseous reactions and particularly to methods of and apparatus for initiating reactions which are to be carried on at elevated temperatures and pressures.

In conducting exothermic catalytic gaseous reactions under pressure there is, generally speaking, a limit to the temperature at which the compressed gases can safely be delivered to and withdrawn from the reaction apparatus. The reaction apparatus can be provided with a thick pressure-sustaining wall made from a special alloy forging; or, if more common materials of construction are used, the pressure-sustaining wall can be protected by arranging that a screen of cool incoming gas is interposed between the wall and the hot catalyst. Gas conduits, on the other hand, must be made of metals that can be drawn and this precludes the use of alloys such as are adapted for construction of the reaction vessel wall. It also, as is obvious, in the case of gas conduits is impossible to provide protection by a cool gas stream such as may be used in the reaction apparatus. These considerations, therefore, place a limit upon the temperature at which the compressed gases can be delivered to the apparatus in which they are to undergo reaction. In the case of such gaseous reactions as the synthesis of alcohols or the synthesis of ammonia, for instance, it is not feasible to handle the compressed hydrogen-containing gases in steel conduits at temperatures above about 300° C.

If the reaction in question is to be conducted at an elevated temperature and the catalyst employed is such as will not initiate the reaction below the maximum temperature at which the compressed gases can be handled exteriorly of the apparatus, it will be necessary to provide within the latter some means for heating the gases to start the reaction. This need exists in spite of the fact that the reaction to be effected may be highly exothermic. Assuming that the reaction has been started, by externally preheating the gases to the maximum temperature permissible for the handling thereof in gas conduits, heat exchange means can be provided within the reaction apparatus by which the heat in the catalyst and the hot gaseous products can be utilized to warm the incoming gases to the temperature at which the reaction is being carried on. And at the same time this heat exchange means may be employed for cooling the hot gaseous products to a temperature at which they can with safety be delivered to external gas conduits. However, before the reaction has been initiated, and when consequently no heat is available from the reaction, some expedient must be resorted to for raising the gases, after they have entered the apparatus, to the temperature at which the catalyst will begin to function.

It has previously been proposed to employ for this purpose an electrical heating element disposed within the apparatus in the path of the gaseous stream. The use of devices of this character is not desirable, however, because of the difficulty of making electrical connections through the metallic pressure-sustaining wall and also because materials that are electrically suitable for the construction of the heating element are apt to be corroded by the hot gases or to bring about undesirable reactions thereof.

It will be apparent, therefore, that in effecting exothermic gaseous reactions under pressure by means of catalysts that are active only at relatively high temperatures a serious practical problem exists in connection with the provision of a suitable method of and apparatus for initiating such reactions that will not involve elaborate equipment nor interfere with the normal progress of the reaction.

With a particular view to overcoming the aforementioned difficulties it is the object of the present invention to provide a practical and efficient method of initiating catalytic exothermic gaseous reactions that are to be conducted at relatively high temperatures.

It is a further object of the invention to provide an improved apparatus for initiating and carrying on reactions of this character.

Other objects and advantages of the invention will be apparent as it is better understood by reference to the following description and to the accompanying drawings in which—

Figure 1:
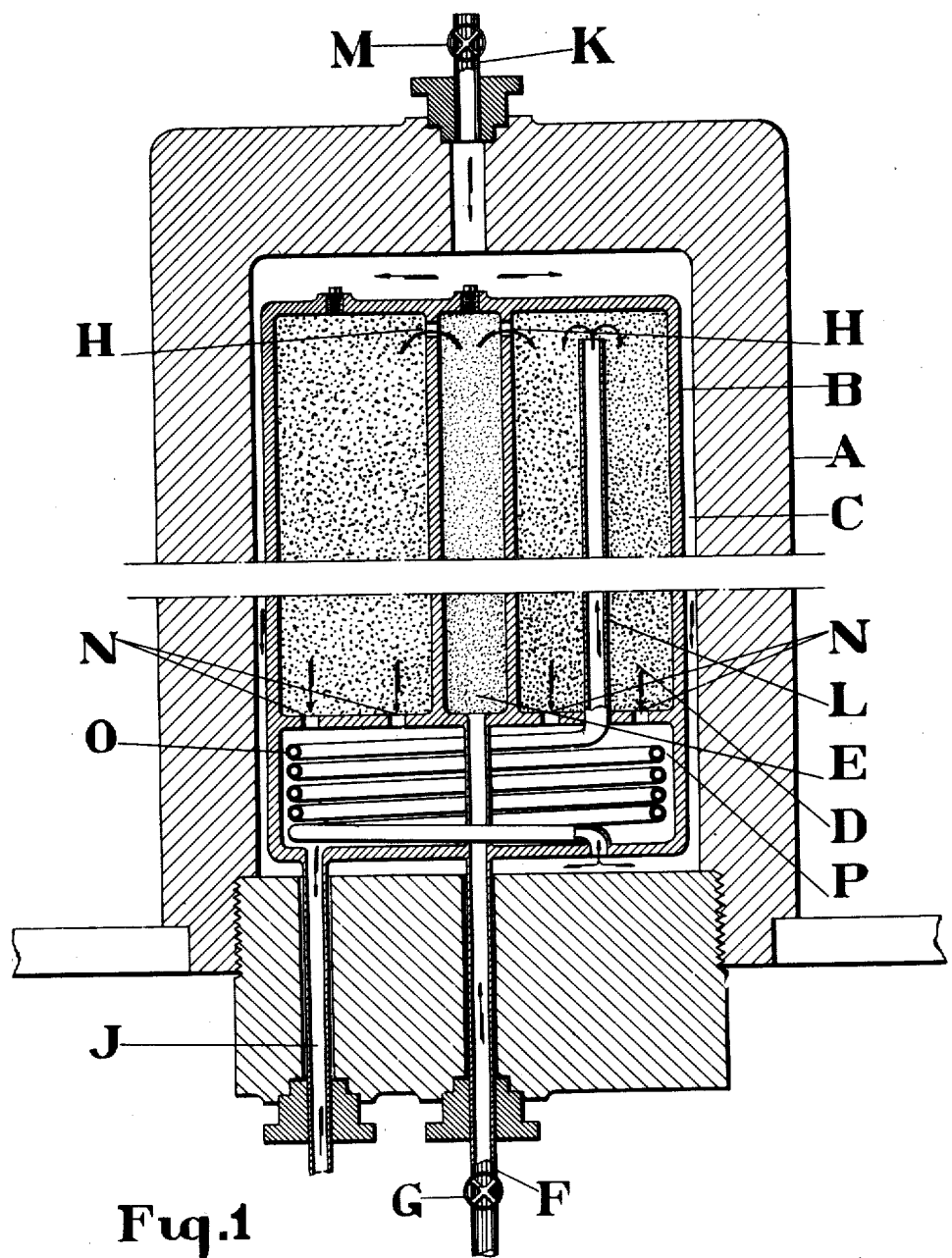
Figure 1 is a cross-sectional view of a form of apparatus suitable for use in the practice of the invention, and—

In accordance with the present invention the heat required for initiation of gaseous reactions that are to be conducted under pressure and at relatively high temperatures is derived from a "priming" reaction, that is, an auxiliary catalytic exothermic reaction involving the gases in question, this reaction being carried on within the reaction apparatus under such conditions that the heat evolved is made available for warming the gaseous stream, the apparatus and the main catalyst to the temperature required for the functioning of that catalyst. In other words, in order to initiate the process I conduct the compressed gases over a priming catalyst, this being a catalyst necessarily somewhat different from the main catalyst and adapted to bring about an exothermic reaction of the gases at a relatively low temperature; i. e., a temperature at which the handling of the gases on their way to the apparatus presents no problem at which the main catalyst is not active.

The priming reaction may be effected before the gases contact with the main or producer catalyst, the heat evolved by the priming reaction being thereby conveyed to the producer catalyst by means of the gaseous stream itself. The effectiveness of the priming reaction may be improved, moreover, by disposing the priming catalyst in heat exchange relation to the producer catalyst; as, for example, by employing an apparatus containing two concentric catalyst chambers, the innermost filled with priming catalyst and the outermost with producer catalyst.

The priming reaction may also be effected after the gases have contacted with the producer catalyst. When the principle of the invention is applied in this manner the gases on entering the reaction apparatus pass over the producer catalyst, then over the priming catalyst and in their thus heated condition are subjected to heat exchange with subsequent portions of the gaseous stream entering the apparatus. This method of operation has several advantages including the simplicity of apparatus required, since it is possible to employ a single catalyst chamber in the first portion of which the producer catalyst is disposed and in the last portion of which the priming catalyst is disposed. There is the further important advantage that with the priming catalyst following the producer catalyst the possibility of contamination of the latter by products of the priming reaction or by substances carried over from the priming catalyst is eliminated.

As a further feature of the invention I provide an apparatus, to be hereinafter more fully described, the outstanding feature of which is the provision of a reaction chamber containing catalyst for the main reaction and a heating chamber for preheating the gases, with suitable means for by-passing the heating chamber. This apparatus is particularly adapted for effecting a process of the type previously described, wherein the preheating of the gaseous stream is accomplished by passage over a priming catalyst before contact with the producer catalyst. However, the apparatus is also adapted for the use of other means for preheating the gases as, for example, an electrical heating element. By employing this type of apparatus I am able to remove the heating chamber from the path of the gaseous stream when the reaction has been initiated and thus avoid any disadvantage connected with passage of the gases through the heating chamber after the reaction has gotten under way.

While the general character of the invention will be understood from the foregoing statement thereof the objects and advantages previously referred to as well as others that will be obvious to those skilled in the art will be made more clear by reference to the following description of two forms of apparatus adapted for use in practicing the invention.

Referring to Figure 1 of the drawings, the apparatus comprises a pressure-sustaining wall A enclosing a reaction chamber B spaced therefrom to form an annular gas passage C. The reaction chamber B consists of two compartments—an outer annular reaction chamber containing the producer catalyst D and an inner heating chamber containing the priming catalyst E. The heating chamber communicates at one end with a gas inlet F provided with a valve G and at the other end with the outer catalyst compartment through orifices H in the intervening wall. The reaction chamber is provided at its lower end with orifices N through which it communicates with a heat exchange compartment O which, after the reaction has gotten under way, is used for warming the incoming gases at the expense of the hot gases that have traversed the catalyst D. A gas exit J leads from the compartment O. A second gas inlet K controlled by a valve M communicates with the catalyst D by way of the annular gas passage C, the heat exchange coils P and the conduit L. The inlets K and F are connected, by means not shown, to a common gas supply. In starting the reaction the valve M is closed and the valve G open. The compressed gases that are to react are led at a relatively low temperature through the inlet F directly to the priming catalyst E in contact with which they undergo an exothermic reaction. Leaving the inner compartment through the orifices H they flow in the reverse direction in contact with the producer catalyst D and are then discharged from the apparatus through the orifices N and the outlet J. The gases initially are admitted to the apparatus at such a temperature as may be required for commencement of the priming reaction; this temperature, however, will, of course, be below that required for the functioning of the catalyst D and in any event should not be so high as to cause any difficulty in handling the gases outside the reaction apparatus. The reaction effected by the priming catalyst E may be at first slight but as this catalyst becomes warmer the reaction proceeds more rapidly. Thus the gases flowing through the orifices H into contact with the producer catalyst D are progressively warmer and warmer, the catalyst D being, therefore, warmed by the gases flowing through it and also by heat exchange with the priming catalyst E and the gases in contact therewith. When the producer catalyst D has attained a temperature at which it will begin to function, the heating chamber is by-passed by opening the valve M and closing the valve G so that thereafter the incoming gases do not traverse the priming catalyst but, flowing downward through the annular passage C, are delivered directly to the producer catalyst D by way of the heat exchange coils P and the conduit L. While traversing the passage C the incoming gases are warmed by heat exchange with the hot catalyst and at the same time protect the wall A from the heat of the reaction. The gases are further warmed, while flowing through coils P, by the hot gases leaving the catalyst D. In contact with the producer catalyst D the desired reaction of the gases is effected and the hot gaseous products pass through the orifices N into the heat exchange compartment O where they are cooled by the incoming gases in the coils P to a temperature at which they can safely be handled in conduits exteriorly of the apparatus. After removal of the products of reaction any unconverted gases may be submitted to further reaction in the same or a similar apparatus.

Figure 2:
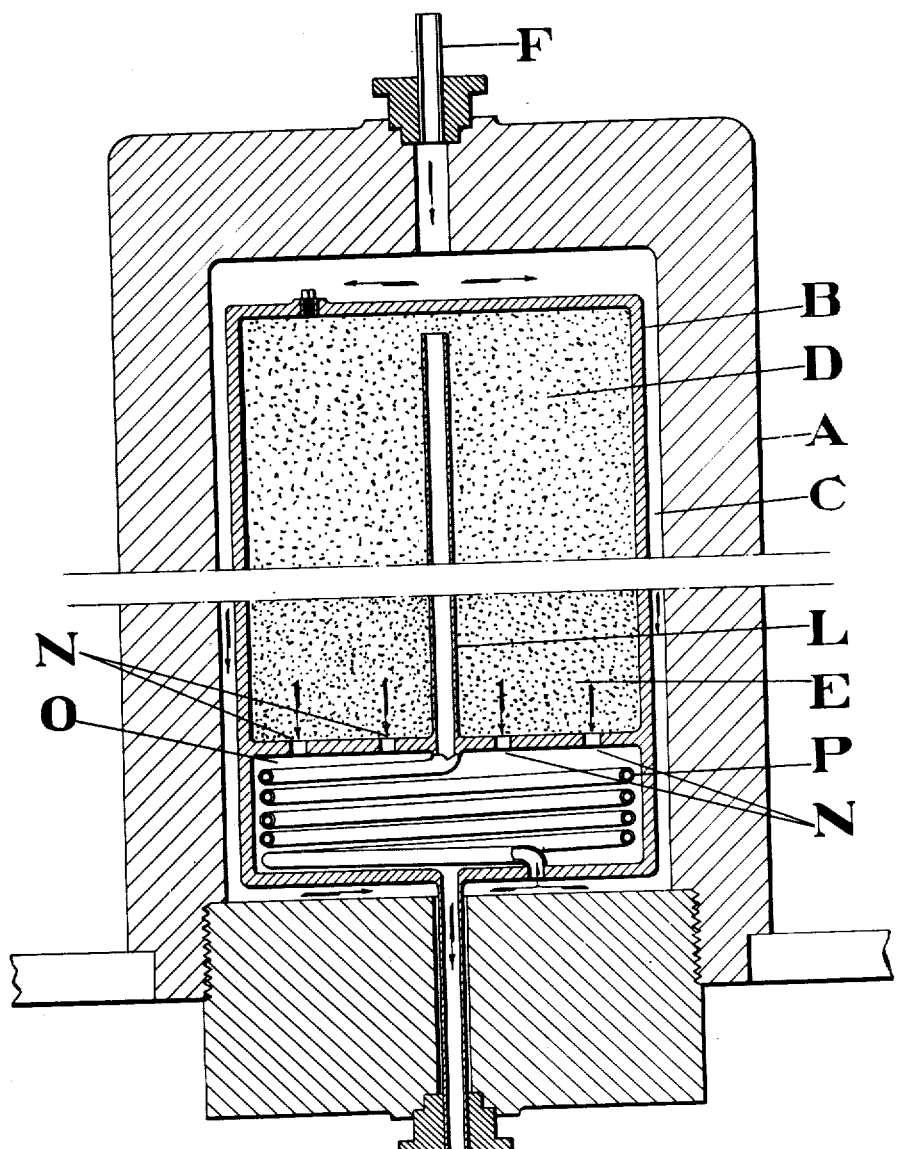
Figure 2 is a similar representation of another form of apparatus.

A second form of apparatus that can be used in the practice of the invention is illustrated in Figure 2. Referring to Figure 2, the apparatus comprises a pressure-sustaining wall A enclosing a heat exchange compartment O and a reaction chamber B, the latter containing separate bodies of producer catalyst D and priming catalyst E so disposed that the gases traverse the priming catalyst only after they have passed over the producer catalyst.

In starting a process employing this apparatus the compressed gases, preheated to a temperature no higher than may safely be employed in external gas conduits, enter the apparatus by way of the inlet F and flow successively through the annular passage C, the heat exchange coils P and the conduit L to the upper end of the apparatus where they are delivered to the producer catalyst D. The gases pass down over the producer catalyst and then over the priming catalyst E, and in contact with the latter they react exothermically. Thus heated, the gases flow through the heat exchange compartment O in which they warm succeeding portions of incoming gases in the coils P.

It will be seen that in this manner the gases coming into contact with the producer catalyst become gradually warmer and warmer until they reach the temperature required for functioning of the producer catalyst.

When initiation of the main reaction is thus accomplished the temperature of the producer catalyst will, because of the heat developed by the main reaction, continue to rise until the temperature desired for continuous operation of the process is reached. Thereafter the temperature may be controlled by regulating the rate of flow and/or the temperature of the incoming gases. As the extent of the reaction effected by the catalyst D increases the concentration of reactants leaving E will decrease so that finally the priming catalyst will no longer function.

The hot gases leaving the reaction chamber through the orifices N are cooled by heat interchange with the incoming gases flowing through the coils P to a temperature at which they may with safety be withdrawn to external conduits by means of which they are delivered to apparatus, not shown, for recovery of the products of the reaction.

It will be understood that the character of the priming catalyst used will depend inter alia upon the nature of the gases to be handled, the main reaction to be effected and the products to be prepared. By way of example I mention the synthesis of the higher homologues of methanol from a gaseous mixture of hydrogen and carbon monoxide at high pressures, say 200 atmospheres and upwards, as illustrating a reaction to which the invention may very advantageously be applied. For the sake of obtaining the highest quality of product it is desirable that this synthesis be effected at elevated temperatures, say 450 to 500° C., and for proper operation at these temperatures the catalysts that are most suitable are such as actually exhibit no activity for the reaction below about 350° C. On the other hand, it is not practically feasible to handle compressed hydrogen-carbon monoxide mixture in high pressure pipes outside the reaction apparatus at temperatures above about 300° C. The initiation of the higher alcohol synthesis may be effected in accordance with the present invention by using a methanol-forming catalyst as the priming catalyst. This catalyst may be, for example, a reduced mixture of precipitated oxides of copper, manganese and magnesium, which will initiate interaction of hydrogen and carbon monoxide to form methanol at temperatures as low as 250° C. At such low temperatures there is no difficulty in handling the compressed gaseous mixture exteriorly of the synthesis apparatus.

On the other hand, where the high pressure reaction of hydrogen and carbon monoxide is carried on for the production of methanol alone it may be desirable for the sake of continuity of operation to use a more rugged and therefore less active catalyst than the one which has been referred to above as a priming catalyst for use in higher alcohol synthesis. Under these circumstances in accordance with the invention one may use in connection with the relatively high temperature methanol producer catalyst a priming catalyst such as the copper-manganese-magnesium oxide methanol catalyst referred to, or better an active methane-forming catalyst such as, for example, a reduced mixture of precipitated oxides of cobalt and magnesium, which will initiate the formation of methane at even lower temperatures.

The invention contemplates the possibility of utilizing in the priming reaction not only the normal gaseous mixture but also other substances that may temporarily be added thereto during the starting period for the purpose of effecting a priming reaction. Thus, for example, in the synthesis of ammonia from a nitrogen-hydrogen mixture derived from water-gas, by reducing the amount of carbon monoxide purification effected the carbon monoxide content of the nitrogen-hydrogen mixture may temporarily be increased during the starting period of the ammonia synthesis and the gases may be passed over a low temperature methane-forming catalyst for the purpose of initiating the ammonia synthesis reaction.

Various changes may be made in the method and apparatus described without departing from the invention or sacrificing any of the advantages thereof.

I claim:

1. The method of initiating a catalytic exothermic gaseous reaction to be conducted under pressure and at a relatively high temperature, which comprises passing the compressed gases at a temperature lower than that at which the catalyst for the main reaction will function into contact with a priming catalyst, the priming catalyst being adapted to catalyze an exothermic reaction of the gases at the lower temperature, and directing the thus heated gases upon the catalyst for the main reaction.

2. The method of initiating a catalytic exothermic gaseous reaction to be conducted under pressure and at a relatively high temperature, which comprises heating the compressed gases by passage thereof at a temperature lower than that at which the catalyst for the main reaction will function into contact with a priming catalyst, the priming catalyst being adapted to catalyze an exothermic reaction of the gases at the lower temperature, and thereafter directing the gases on the catalyst for the main reaction.

3. The method of initiating a catalytic exothermic gaseous reaction to be conducted under pressure and at a relatively high temperature, which comprises passing the compressed gases at a temperature lower than that at which the catalyst for the main reaction will function into contact with a priming catalyst, the priming catalyst being adapted to catalyze an exothermic reaction of the gases at the lower temperature, and simultaneously in heat exchange relation with the catalyst for the main reaction.

4. In a process for effecting an exothermic reaction by conducting a stream of gases over a catalyst active only at a relatively elevated temperature, the method of initiating the reaction which comprises conducting the gaseous stream at a relatively lower temperature preliminarily in heat exchange relation to but out of contact with the catalyst for the main reaction and simultaneously in contact with a priming catalyst, the priming catalyst being adapted to catalyze an exothermic reaction of the gases at the lower temperature, and thereafter directing the gases over the catalyst for the main reaction.

5. In a process for effecting an exothermic reaction by conducting a stream of gases over a catalyst active only at a relatively elevated temperature, the method of initiating the reaction which comprises conducting the gaseous stream at a relatively lower temperature preliminarily in heat exchange relation to but out of contact with the catalyst for the main reaction and simultaneously in contact with a priming catalyst, the priming catalyst being adapted to catalyze an exothermic reaction of the gases at the lower temperature, and thereafter directing the gases over the catalyst for the main reaction until said catalyst has attained the temperature required for initiation of the main reaction, thereafter removing the priming catalyst from the path of the gaseous stream.

6. The method of initiating an exothermic catalytic gaseous reaction which comprises introducing the gases preliminarily, at a temperature lower than that at which the main reaction can be initiated, to a catalyst capable of catalyzing a different exothermic reaction of the gases at the lower temperature and then conducting the gases over the catalyst for the main reaction, in heat exchange relation to but out of contact with the preliminary catalyst.

7. The method of initiating an exothermic catalytic gaseous reaction which comprises passing the gaseous stream of reactants successively over the producer catalyst and a priming catalyst, the priming catalyst being adapted to catalyze an exothermic reaction of the gases at a lower temperature than the producer catalyst and thereafter in heat exchange relation with subsequent portions of the gaseous stream before delivery thereof to the producer catalyst.

8. In a process for effecting an exothermic reaction by conducting a stream of gases over a catalyst, the method of controlling the reaction temperature which comprises passing a portion of said gaseous stream over a priming catalyst before delivery to the producer catalyst and delivering another portion of said gaseous stream directly to the producer catalyst, and regulating the temperature of the reaction by varying the relative size of said portions of the gaseous stream.

9. In an apparatus for conducting a gaseous exothermic reaction under pressure the combination of a pressure-sustaining wall enclosing a heating chamber containing a priming catalyst which is adapted to catalyze an exothermic reaction of the gases at a temperature lower than is the catalyst for the main reaction, and communicating therewith a reaction chamber containing catalyst for the main reaction, with means for by-passing said heating chamber.

In testimony whereof I affix my signature.

JOHN L. BRILL.

CERTIFICATE OF CORRECTION.

Patent No. 1,893,492.      January 10, 1933.

JOHN L. BRILL.

It is hereby certified that error appears in the printed specification of the above numbered patent requiring correction as follows: Page 2, line 26, after "problem" insert the word "and"; and that the said Letters Patent should be read with this correction therein that the same may conform to the record of the case in the Patent Office.

Signed and sealed this 28th day of February, A. D. 1933.

M. J. Moore, (Seal)      Acting Commissioner of Patents.

tion of the gases at a lower temperature than the producer catalyst and thereafter in heat exchange relation with subsequent portions of the gaseous stream before delivery thereof to the producer catalyst.

8. In a process for effecting an exothermic reaction by conducting a stream of gases over a catalyst, the method of controlling the reaction temperature which comprises passing a portion of said gaseous stream over a priming catalyst before delivery to the producer catalyst and delivering another portion of said gaseous stream directly to the producer catalyst, and regulating the temperature of the reaction by varying the relative size of said portions of the gaseous stream.

9. In an apparatus for conducting a gaseous exothermic reaction under pressure the combination of a pressure-sustaining wall enclosing a heating chamber containing a priming catalyst which is adapted to catalyze an exothermic reaction of the gases at a temperature lower than is the catalyst for the main reaction, and communicating therewith a reaction chamber containing catalyst for the main reaction, with means for bypassing said heating chamber.

In testimony whereof I affix my signature.

JOHN L. BRILL.

CERTIFICATE OF CORRECTION.

Patent No. 1,893,492.　　　　　　　　　　　　　　　　　　　　January 10, 1933.

JOHN L. BRILL.

It is hereby certified that error appears in the printed specification of the above numbered patent requiring correction as follows: Page 2, line 26, after "problem" insert the word "and"; and that the said Letters Patent should be read with this correction therein that the same may conform to the record of the case in the Patent Office.

Signed and sealed this 28th day of February, A. D. 1933.

M. J. Moore, (Seal)　　　　　　　　　　　　　　　　　　　　Acting Commissioner of Patents.

CERTIFICATE OF CORRECTION.

Patent No. 1,893,492.  January 10, 1933.

JOHN L. BRILL.

It is hereby certified that error appears in the printed specification of the above numbered patent requiring correction as follows: Page 2, line 26, after "problem" insert the word "and"; and that the said Letters Patent should be read with this correction therein that the same may conform to the record of the case in the Patent Office.

Signed and sealed this 28th day of February, A. D. 1933.

M. J. Moore, (Seal) Acting Commissioner of Patents.